UNITED STATES PATENT OFFICE.

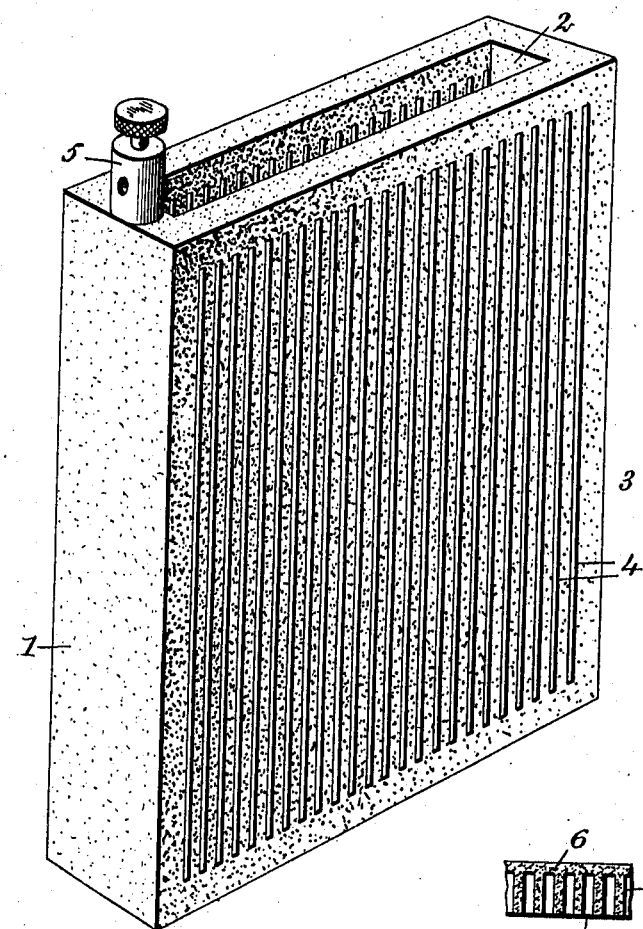
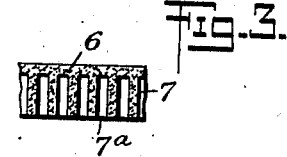
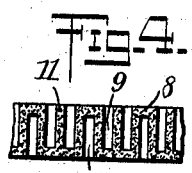
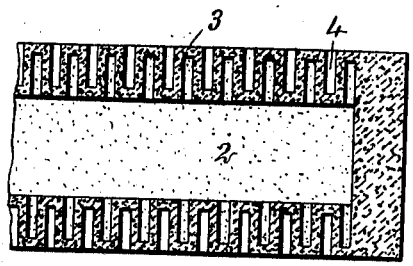

PIERRE J. KAMPERDYK, OF NEW YORK, N. Y.

POROUS-CUP ELECTRODE.

982,729. Specification of Letters Patent. Patented Jan. 24, 1911.

Application filed November 9, 1907, Serial No. 401,430. Renewed May 20, 1910. Serial No. 562,408.

*To all whom it may concern:*

Be it known that I, PIERRE J. KAMPERDYK, a subject of the King of Belgium, and a resident of the city of New York, borough of Manhattan, in the county and State of New York, have invented a new and Improved Porous-Cup Electrode, of which the following is a full, clear, and exact description.

This invention relates to primary batteries or cells, and especially to that type of cells which employ two fluids separated by a porous wall or cup.

The object of the invention is to produce a porous wall or cup which will offer a low resistance, and which will present a greatly increased area to the exciting fluid.

Porous cups or partition walls of two-fluid cells have been employed, composed of carbon. This material is highly porous and answers the requirements in this particular. It is, however, a bad conductor and is therefore of little value where the porous cup or partition wall is used as an electrode of the cell. A cup or partition wall of graphite, to be used in a two-fluid cell, would seem to be impracticable, as graphite is substantially non-porous. I have discovered that, though a graphite wall is substantially non-porous for ordinary purposes, and consequently non-permeable when of ordinary form, it is possible to construct such a wall of graphite as will be sufficiently permeable for the use suggested. This, of course, is possible because the graphite is actually slightly porous. By giving the wall a special form, producing a very thin separating partition between the fluids and greatly increasing the superficial area, I am enabled to produce a permeable wall or cup out of a substantially non-porous material. As graphite is about three times as conductive as carbon, the cup or wall will act with great efficiency as an electrode.

The invention consists in employing a substance of high conductivity which, on account of its density and low porosity, has not heretofore been used as a composition for porous cup electrodes, and I give the wall such a form as will render it practically permeable to the electrolyte.

Reference is to be had to the accompanying drawings forming a part of this specification, in which similar characters of reference indicate corresponding parts in all the figures.

Figure 1 is a perspective of a porous cup electrode constructed according to my invention; Fig. 2 is a horizontal section taken through a portion of the cup shown in Fig. 1; Fig. 3 is a section through the wall of a cup of a slightly modified form, and Fig. 4 is a view similar to Fig. 3, and showing another modified form.

Referring more particularly to the parts, 1 represents the body of the cup, which is rectangular in form, as shown, presenting a chamber 2. The side walls 3 of the cup are preferably of the form illustrated; that is, they are provided on each face with deep grooves 4 which extend vertically, as indicated, in parallel arrangement. The cuts or grooves on the outside of the wall are arranged intermediate those on the inner side, so that the effect of a rectilinear corrugation is produced, as indicated in Fig. 2. In this way a relatively thin wall is formed between the cuts or grooves and at the ends of the cuts. It will be evident, also, that the superficial area of the side walls of the cup is greatly increased.

Porous carbon cups are worthless as electrodes, because porous carbon is a bad conductor and does not resist attacks of acids. My cup is formed of graphite, which is preferably molded to the required form; if desired, the grooves may be formed in molding the cup but they may, on the other hand, be cut in the wall by tools, such as milling cutters. The cup may also be of built-up form; that is, its side walls may be formed of plates having strips on the edges thereof, except at the upper edges. These plates are then connected together at the strips to form a cup. The cup may also be formed of carbon and afterward graphitized by any of the well known processes. The porous cup is used in a cell or battery as a positive electrode, the depolarizing fluid being placed on the exterior of the cup and the exciting fluid on the interior. At a suitable point the cup is provided with a binding post 5 for the attachment of a conductor.

Instead of using the sinuous form of wall shown in Fig. 2, I may adopt the form of wall shown in Fig. 3, which is simpler but does not give so great a surface or porosity. In this form, the side wall 6 is provided on its outer side with a plurality of outwardly-projecting rectangular ribs or fins 7, which are disposed a slight distance apart to form grooves 7ª which extend vertically in parallel arrangement. In this form the superficial area of the cup is greatly increased, while the area of the portion of the wall which conducts the depolarizing fluid is not increased.

In Fig. 4 I show a form of the wall which may be considered as a combination of the two forms shown in Figs. 2 and 3. In this case I provide a sinuous wall 8 presenting grooves 9 on the inner side arranged in pairs disposed close together, and between these pairs of grooves single grooves 10 are formed on the outer side of the wall. In this way the superficial area of the wall is greatly increased, and a portion of the conducting part of the porous wall is also increased. In this connection attention is called to the fins 11 which are formed on the inner side of the wall between the grooves 9, and by the combination of the forms shown in Figs. 1 and 3 I obtain the form shown in Fig. 4, in which the extent of porosity is intermediate in amount.

An electrode composed of graphite as described, is sufficiently porous to perform the functions of the porous cup in a voltaic cell, and at the same time it is a relatively good conductor, being far superior in this respect to a carbon electrode.

The invention may be practiced by employing a single wall separating the two fluids and having the form in cross section, illustrated.

While graphite is relatively not greatly porous, I make it efficient as a porous cup by forming the separating wall as described; and it will be observed that by adopting the form suggested I greatly increase the area of the cup and at the same time reduce the thickness of the wall without weakening the same. Both these features are factors in increasing the efficiency of the cup.

Having thus described my invention, I claim as new and desire to secure by Letters Patent:

1. A separating wall constituting an electrode for two-fluid cells, composed of a substantially non-porous, highly conductive material having a wall so thin as to render said wall permeable to the electrolyte, said wall having reinforcing extensions laterally disposed.

2. A separating wall constituting an electrode for two-fluid cells, composed of a dense, substantially non-porous, highly conductive material, said wall having a form presenting a plurality of small areas, the aggregate whereof is sufficient to render said wall substantially permeable to the electrolyte.

3. An imperforate separating wall for voltaic cells, composed solely of graphite.

In testimony whereof I have signed my name to this specification in the presence of two subscribing witnesses.

PIERRE J. KAMPERDYK.

Witnesses:
F. D. AMMEN,
EVERARD B. MARSHALL.